3,737,372
INSTALLATION FOR SURVEYING THE DISPLACEMENT OF A STRUCTURE IN A NUCLEAR REACTOR
Philippe Debergh, Massy, and Maurice Lagrange, Paris, France, assignors to Commissariat a l'Energie Atomique, Paris, France
Filed Mar. 31, 1971, Ser. No. 129,670
Claims priority, application France, Apr. 10, 1970, 7013099
Int. Cl. G21c *17/00*
U.S. Cl. 176—19 R
8 Claims

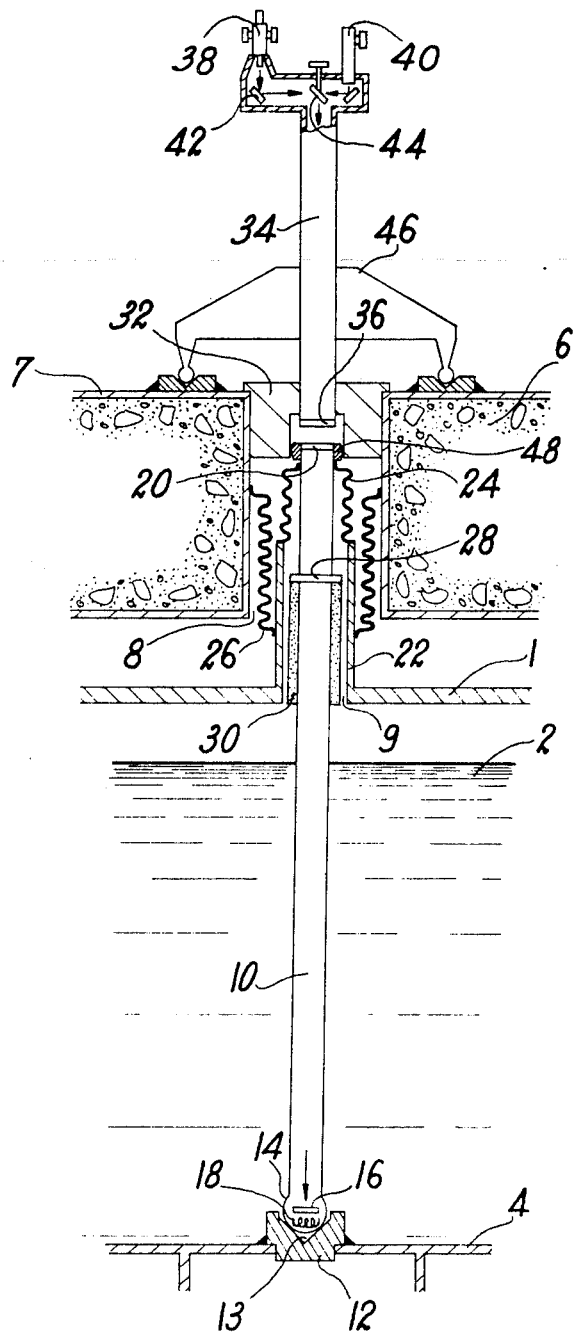

ABSTRACT OF THE DISCLOSURE

The installation comprises a closed tube, one end of which contains a sighting gage and is supported by the structure to be surveyed whilst the other end of the tube which is closed by a viewing window is centered and maintained elastically within an opening of a stationary component. An observation tube is fixed in the opening of the stationary component and connects an object lens placed directly above the viewing window to an optical system.

---

In nuclear reactors, the temperatures of the upper and lower portions of the reactor vessel which contains the core are usually very different, thus causing differential expansions of the different components. This applies particularly to the case of fast reactors which are cooled by a liquid metal such as sodium and in which the core-supporting grid, or diagrid, is at a high temperature which is nevertheless of lower value than the prevailing temperature in the top portion of the reactor vessel and is connected to components and fuel elements which are subjected to high thermal gradients.

Means for limiting thermal gradients are evidently employed but it nevertheless remains necessary to measure the displacements of the different components in order to check the effectiveness of such means and ensure compliance with safety requirements.

The object of this invention is to provide an installation which permits the possibility of surveying displacements of this type.

Accordingly, the invention is directed to an installation comprising a closed tube which at one end thereof contains a sighting gage and is supported by the structure to be surveyed and at the other end thereof is closed by a viewing window and is centered and maintained elastically within an opening of a stationary component, and an observation tube fixed in said opening for connecting an object-lens placed directly above said viewing window to an optical system.

Any vertical displacement of the supporting structure is transmitted to the closed tube which moves with respect to the object-lens. Similarly, lateral displacements cause a pivotal movement of said tube within the opening of the stationary component, that is to say a displacement of the sighting gage which is immediately observed by the optical system.

The following description of one embodiment of the invention which is given by way of non-limitative example and illustrated in longitudinal cross-section in the single figure of the accompanying drawings will in any case bring out the advantages and characteristic features of the invention.

The figure illustrates an installation for surveying the displacement of the core-supporting structure of a nuclear reactor but it is readily apparent that the installation according to the invention could be employed for other structures. The reactor which is illustrated is of the fast-neutron type, for example, and comprises a vessel 1, only the top wall of which is illustrated and which is almost completely filled with a liquid coolant 2 such as liquid sodium.

Within said vessel, the reactor core (not shown) is supported by a diagrid 4 whilst the fuel assemblies, control rods and other components are intended to rest on said diagrid and to extend through the top cover-plate 1 of the vessel or are connected thereto. The reactor vessel as a whole is protected by a biological shield structure which is preferably of concrete and especially by a top shield slab 6. Said slab 6 is provided with a penetration opening 8 which is coaxial with an opening 9 formed in the top cover-plate 1 of the reactor vessel.

A tube 10 which is closed at both ends is placed in the axis of said openings 8 and 9 and extends through the entire reactor vessel, the lower end of said tube being supported on a block 12 which is rigidly fixed to the diagrid 4. Said block is provided with a conical recess 13 which is intended to accommodate the spherical end 14 of said tube 10, there being placed within said spherical end 14 a sighting gage 16 which is illuminated by a heating resistor 18.

The tube 10 which passes through the entire reactor vessel projects to the exterior of this latter and extends beyond a sleeve 22 which surrounds the opening 9 within the opening 8 of the slab 6. The passage of said tube through the wall 1 is made leak-tight by a flexible bellows seal 24 which is mounted between the sleeve 22 and the tube 10. A second bellows seal connects said sleeve 22 to the wall of the opening 8. The tube 10 is also centered within the sleeve 22 by means of a flange plate 28 and this latter rests on a biological shield packing 30 which is mounted between the tube 10 and the sleeve 22.

A small lateral clearance is provided between said shield packing 30 and said sleeve in order to provide freedom of pivotal motion and lateral displacement of the tube 10 at the time of displacements of the reactor diagrid 4.

The tube 10 is sealed within the interior of the opening 8 by means of a viewing window. The tube is also maintained in a primary vacuum in order to eliminate any natural convection of gases under the action of temperature gradients arising between the two ends of the tube.

The opening 8 is in turn closed by a plug 32 which is fixed on the outer wall of the slab 6 and traversed by a central tube 34 which supports an object-lens 36 in oppositely-facing relation to the viewing window 20. Said observation tube 34 connects said object-lens 36 to an optical system comprising a microscope 38 and a sighting telescope 40 which is connected to the object-lens 36 by means of a system of mirrors 42 and especially by means of a rotating mirror 44.

The optical system as a whole is supported by a tripod 46 which is rigidly fixed to the tube 34 and rests on the top wall 7 of the slab 6. The optical system is thus centered with strict accuracy and positionally fixed with respect to the opening 8 of the slab.

Any displacement of the diagrid 4, whether in the vertical or horizontal direction, is transmitted to the block 12 which causes displacement of the spherical end 14. Vertical displacements cause axial displacement of the tube 10 and the viewing window 20 with respect to the object-lens 36 whilst lateral displacements result in a pivotal movement of the tube 10 and a lateral movement of the sighting gage 16 with respect to the axis of said object-lens 36. An annular bearing 48 is fixed around the tube 10 and viewing window 20 between these latter and the plug 32 and serves to guide the displacements of the tube with respect to said plug.

Rotation of the mirror 44 serves to direct the light beam onto the microscope 38 or onto the sighting telescope 40 depending on the displacements to be surveyed. In fact, vertical displacements of the tube 10 and consequently of the viewing window 20 are transmitted to the microscope 38 by a micrometer (not shown in the figure) whilst displacements in the horizontal plane, that is to say lateral displacements of the sighting gage 16, are observed and measured by means of the sighting telescope 40 which is fitted with a reticule.

In consequence, it is possible at any moment to follow and to measure the deformations of the core or diagrid support structure and to determine the relative position of this latter with respect to the top wall of the reactor vessel 1 and the slab 6. This displacement can be monitored during operation of the reactor and any accidental or excessive displacement accordingly initiates safety measures:

What we claim is:

1. An installation for surveying the displacement of a structure in a nuclear reactor vessel comprising a closed tube under vacuum, a sighting gage at one end of said tube, said tube being pivotally supported by and on the structure to be surveyed located within the reactor vessel, a viewing window at the other end of said tube said other end of said tube being centered and maintained elastically within an opening of a wall of the reactor vessel, and an observation tube substantially coaxial with and spaced from said closed tube and fixed in said opening connecting an object lens directly above said viewing window to an optical system connected to said tube.

2. An installation according to claim 1, wherein the closed tube is maintained in a primary vacuum.

3. An installation according to claim 1, wherein the lower end of the closed tube is a sphere, said sighting gage being in said sphere and a filament for illuminating said gage in said sphere.

4. An installation according to claim 1, said wall being a shield slab providing biological protection of the reactor.

5. An installation according to claim 5 for surveying the displacement of a nuclear reactor core support structure, including a sleeve, a passageway in said sleeve for said tube and said sleeve being rigidly fixed to the top wall of the reactor vessel, a first elastic system joining said tube to said sleeve in leak-tight manner and a second elastic system joining said tube to the wall of said opening in leak-tight manner.

6. An installation according to claim 5 including a biological shield packing between said sleeve.

7. An installation according to claim 6, including a centering annular bearing secured to said tube and bearing against said slab.

8. An installation according to claim 1, said optical system including a microscope for the observation of vertical displacements of the structure, a sighting telescope and reticule for the observation of displacements of the structure in the horizontal plane and a rotating mirror between said microscope and said telescope and said object-lens.

References Cited

UNITED STATES PATENTS

| | | | |
|---|---|---|---|
| 3,098,811 | 7/1963 | Guidi | 176—30 |
| 3,173,844 | 3/1965 | Jones | 176—30 |

FOREIGN PATENTS

| | | | |
|---|---|---|---|
| 269,853 | 5/1963 | Australia | 176—19 R |

CARL D. QUARFORTH, Primary Examiner

H. E. BEHREND, Assistant Examiner